United States Patent
Ambroladze et al.

(10) Patent No.: US 8,719,618 B2
(45) Date of Patent: May 6, 2014

(54) DYNAMIC CACHE CORRECTION MECHANISM TO ALLOW CONSTANT ACCESS TO ADDRESSABLE INDEX

(75) Inventors: Ekaterina M. Ambroladze, Wappingers Falls, NY (US); Michael A. Blake, Wappingers Falls, NY (US); Timothy C. Bronson, Round Rock, TX (US); Hieu T. Huynh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/495,174

(22) Filed: Jun. 13, 2012

(65) Prior Publication Data

US 2013/0339785 A1    Dec. 19, 2013

(51) Int. Cl.
*G06F 11/00* (2006.01)

(52) U.S. Cl.
USPC ............ 714/6.1; 714/6.11; 714/42; 714/4.2

(58) Field of Classification Search
USPC ........... 711/141, 144, 147; 714/6.1, 4.2, 6.11, 714/42, 25, 48
See application file for complete search history.

(56) References Cited

U.S. PATENT DOCUMENTS

| | | | |
|---|---|---|---|
| 2007/0079072 A1* | 4/2007 | Collier et al. | 711/133 |
| 2008/0244187 A1* | 10/2008 | Bell et al. | 711/136 |
| 2009/0150617 A1* | 6/2009 | Bell et al. | 711/136 |
| 2010/0023697 A1* | 1/2010 | Kapoor et al. | 711/128 |
| 2011/0047411 A1* | 2/2011 | Gille | 714/8 |

* cited by examiner

*Primary Examiner* — Sarai Butler (74) *Attorney, Agent, or Firm* — Cantor Colburn LLP; John Campbell (57) ABSTRACT

A technique is provided for a cache. A cache controller accesses a set in a congruence class and determines that the set contains corrupted data based on an error being found. The cache controller determines that a delete parameter for taking the set offline is met and determines that a number of currently offline sets in the congruence class is higher than an allowable offline number threshold. The cache controller determines not to take the set in which the error was found offline based on determining that the number of currently offline sets in the congruence class is higher than the allowable offline number threshold.

12 Claims, 7 Drawing Sheets

DYNAMIC CACHE CORRECTION MECHANISM TO ALLOW CONSTANT ACCESS TO ADDRESSABLE INDEX

BACKGROUND

An embodiment relates generally to a cache system, and more specifically, to a dynamic cache correction mechanism to allow constant access to an addressable index.

A cache is a component that transparently retains data elements (or simply data) so that future requests for any retained data can be served faster. A data element that is stored within a cache corresponds to a pre-defined storage location within a computer memory system. Such data element might be a value that has recently been computed or a duplicate copy of the same storage location that is also stored elsewhere. If requested data is contained in the cache, this is a cache hit, and this request can be served by simply reading the cache, which is comparatively faster since the cache is usually built close to its requester. Otherwise, if the data is not contained in the cache, this is a cache miss, and the data has to be fetched from system memory (other storage medium) not necessarily close to the requester, and thus is comparatively slower. In general, the greater the number of requests that can be served from the cache, the faster the overall system performance becomes.

To ensure the validity of data in the cache, the data can be checked for errors. Error detection and correction schemes can be either systematic or non-systematic. In a systematic scheme, the transmitter sends the original data, and attaches a fixed number of check bits (or parity data), which are derived from the data bits by some deterministic algorithm. If only error detection is required, a receiver can simply apply the same algorithm to the received data bits and compare its output with the received check bits. If the values do not match, an error has occurred at some point.

SUMMARY

Embodiments include a method, system, and computer program product for a cache. A cache controller accesses a set in a congruence class and determines that the set contains corrupted data based on an error being found. The cache controller determines that a delete parameter for taking the set offline is met and determines that a number of currently offline sets in the congruence class is higher than an allowable offline number threshold. The cache controller determines not to take the set in which the error was found offline based on determining that the number of currently offline sets in the congruence class is higher than the allowable offline number threshold.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

The present disclosure provides features for caches. A cache controller may indicate to a computer system and user that the cache technology is bad and that the cache is near the limit of the addressable index/congruence class. The limit is also variable depending on how quickly the hardware parts can be replaced. When an error is detected, the cache controller also changes the command from evicting the line and taking the set (i.e., bad set) offline to just evicting the data out of the set. Accordingly, the present disclosure will have available sets next time a command (i.e., transaction or operation) needs a set.

With physical technologies becoming smaller and smaller, there are more chances that small defects have a large impact on cache availability. In order to maintain the reliability of the mainframe (e.g., large computer system or server), the cache has to be monitored for errors. Once an uncorrectable error or a stuck bit is detected, the cache will take that set (i.e., cache set also referred to as compartment) offline so that the set will not corrupt any future data. If the error spreads to neighboring sets, this could (potentially) render all the sets in an addressable index (also referred to as a congruence class) ineffective. For a particular congruence class (addressable index), this may create a situation where either the cache controller has no sets to place the data into or may have 1 (one) set that the cache controller has to keep reusing and taking offline right after the use. If there is a lot of traffic to that congruence class (addressable index), this will make the fetch rate very slow and it can create a risk in sending corrupted data out to memory.

According to an embodiment, the cache controller is configured to indicate to the computer system and user that the technology (e.g., one or more congruence classes) is bad and cache is nearing the limit of the congruence class (i.e., addressable index). As noted above, the limit is also variable depending on how quickly the hardware parts can be replaced for the particular memory elements making up the congruence class. The cache controller also changes the command from taking the set offline to just getting (evicting) the data out while the command is in flight, so that the cache controller will have available sets next time a command needs a set. By stopping the cache controller form taking sets offline for a particular congruence class when a minimum number of available sets are reached, the cache controller ensures that the minimum number of sets is available for the particular congruence class.

Figure 1:
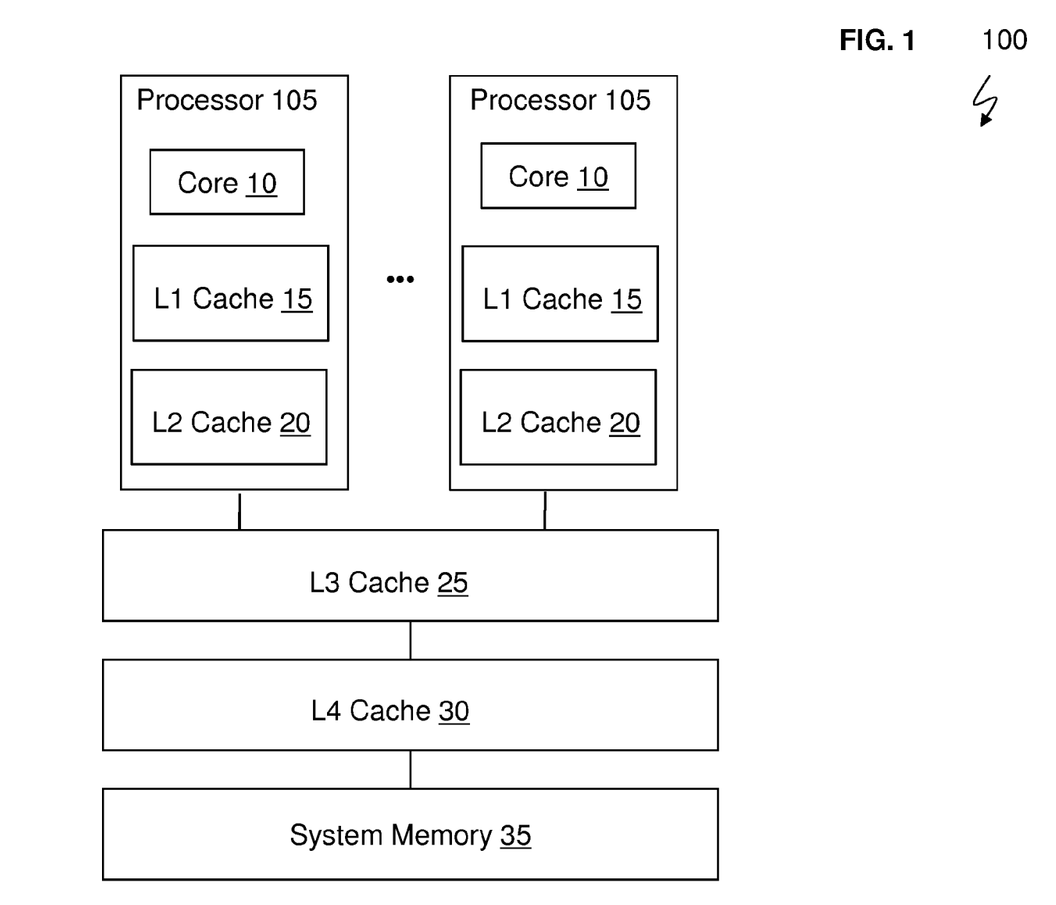
FIG. 1 depicts a system including caches in accordance with an embodiment.

Turning now to FIG. 1, a block diagram of a system 100 is generally shown according to an embodiment. The system 100 includes one or more processors 105. The processors 105 may each have one or more processor cores 10 (e.g., single core, dual core, quad core, etc.), and the processor cores 10 may be referred to as circuitry.

Each processor core 10 may have its own level one (L1) cache 15 and a level two (L2) cache 20. The L1 cache 15 and L2 cache 20 are on-processor (hardware) memory for caching (i.e., retaining) data on the processor 105. The processors 105 may be operatively connected to a level three (L3) cache 25 which is operatively connected to a level four (L4) cache 30.

Data retrieved from system memory 35 may be cached in any of the caches (e.g., in the L1 cache 15, L2 cache 20, L3 cache 25, and/or L4 cache 30). Typically, the cache size increases as the cache level increases. L1 cache 15 will be the smallest size cache and the closest to the processor core 10. The L4 cache 30 will be the largest size cache and furthest away from the processor core 10. System memory 35 will be even larger. All the caches can be inclusive caches, which contain all the data that resides in the lower caches, or victim caches, which contain only data that is sent up from lower caches.

Figure 2A:
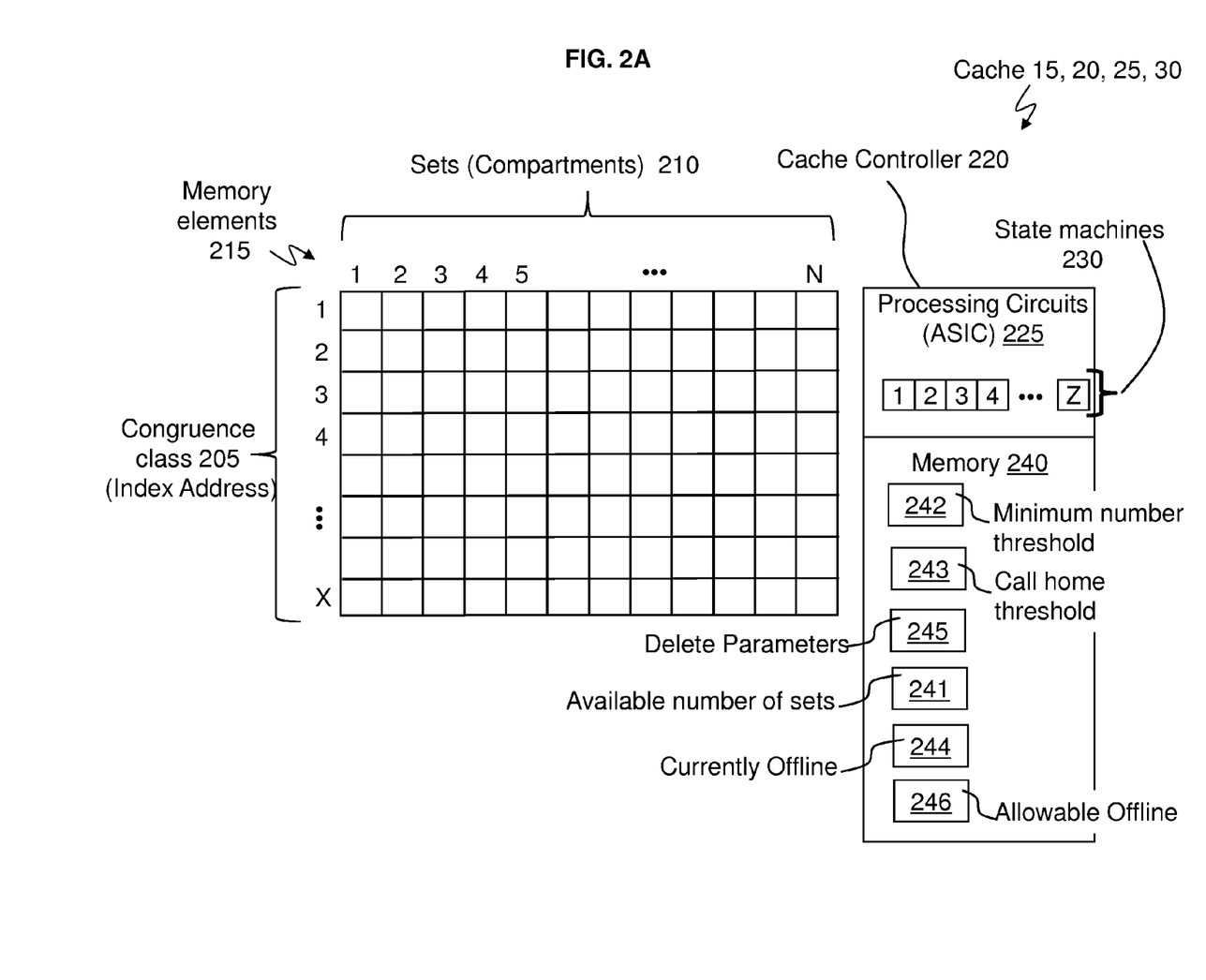
FIG. 2A depicts further details of the caches for managing sets in one or more congruence classes in accordance with an embodiment.
Figure 2B:
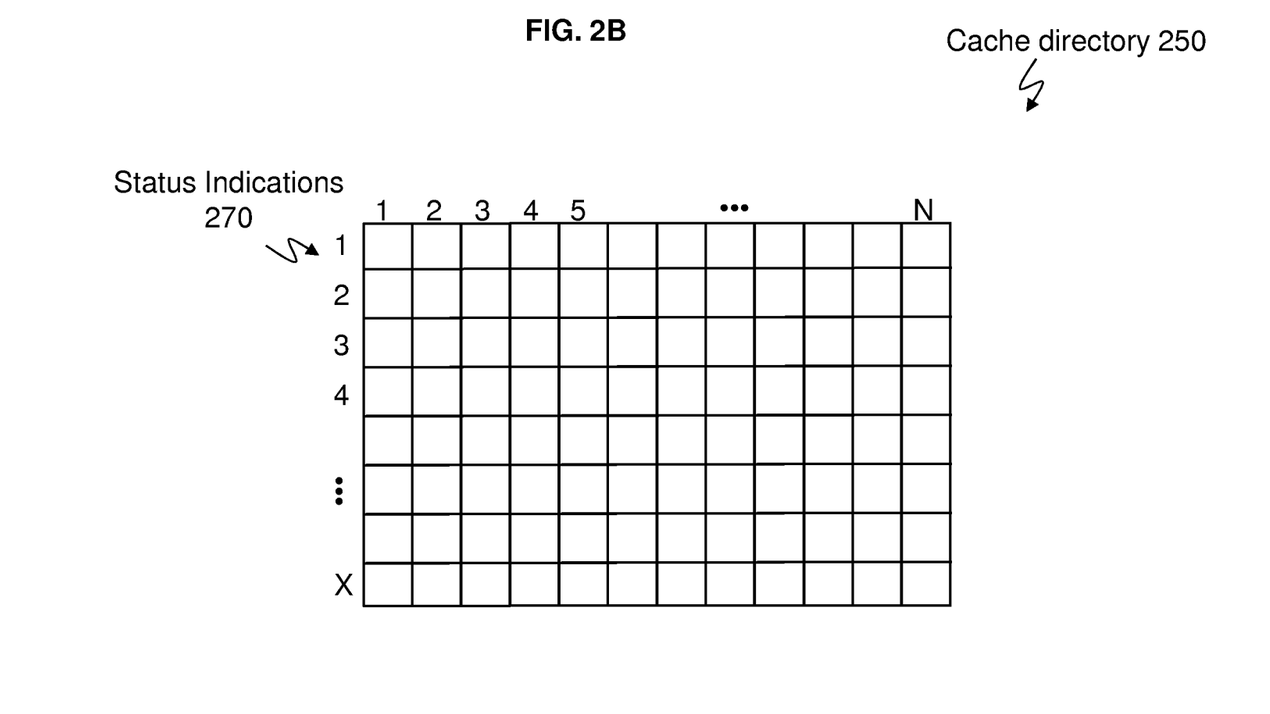
FIG. 2B continues the details of the caches by illustrating a cache directory in accordance with an embodiment.

FIGS. 2A and 2B illustrates further details of the caches which can apply to the L1 cache 15, L2 cache 20, L3 cache 25, and/or L4 cache 30 according to the embodiment. In one case, the details may apply to the L3 cache 25 and L4 cache 20 because of their larger size. FIGS. 2A and 2B may generally be referred to as FIG. 2

For ease of explanation and not limitation, reference is made to the L3 cache 25 when discussing FIG. 2 and it is contemplated that the explanations applies to all caches including L1 cache 15, L2 cache 20, L3 cache 25, and L4 cache 30.

In FIG. 2, the L3 cache 25 (along with 15, 20, 30) may be an N-way set associative cache, with 1-X congruence classes 205 (shown as rows) and 1-N sets (shown as columns) as understood by one skilled in the art. As discussed herein, each congruence class 205 can also be referred to as an addressable index, and each set 210 can be referred to as a compartment.

In the example shown in FIG. 2, this is a 12-way set associative cache for the L3 cache 25. There could be fewer or more sets 210 in the cache as desired, and 12 sets are used for explanation purposes.

The L3 cache 25 has numerous memory elements 215 each of which stores data. The memory elements 215 also referred to as memory cells are integrated circuits for storing data. The L3 cache 25 also includes a cache controller 220 that controls loading (writing), evicting, and reading (requesting) data in the memory elements 215 of the L3 cache 25. The L3 cache 25 includes a cache directory 250 which maintains the state of each set (compartment) 210. The cache controller 220 controls and makes updates to the cache directory 250 as well as the memory elements 215.

FIG. 2B shows the cache directory 250. The cache directly 250 has a grid of status indications 260, where each individual status indication 260 directly represents a corresponding memory element 215 in the cache (e.g., L3 cache 25) in FIG. 2A. Each set (compartment) 210 has its own corresponding bits that indicate the status, valid or invalid, empty, owned, offline, etc.

The cache controller 220 may include processing circuits 225 which may be application specific integrated circuits (ASIC) and various state machines 230. The state machine (e.g., finite-state machine (FSM) or finite-state automaton) read a series of inputs. When the state machine reads an input it will switch to a different state. Each state specifies which state to switch for a given input.

For example, the state machine is a mathematical model used to design computer programs and digital logic circuits. The state machine can be in one of a finite number of states. The state machine is in only one state at a time, and the state it is in at any given time is called the current state. The state can change from one state to another when initiated by a triggering event or condition, and this is called a transition. Each particular state machine 230 is defined by a list of the possible transition states from each current state and by the triggering condition for each transition.

The state machines 230 have different roles that they are designed to fulfill. The state machines 230 may be used by a transaction or operation to access data stored in the memory elements 215. The state machines 230 can access the memory elements 215 (i.e., access the cache) for any of the processors 105 (e.g., any of the respective processor cores 10, any application in the system memory 35, etc.).

In a cache and/or the cache directory 250, there can be correctable errors and uncorrectable errors. Typically, when a set 210 in a congruence class 205 has an uncorrectable error, the data in the set 210 is evicted out (i.e., purged) and the set 210 is take offline (deleted/no longer available for use) by the cache controller 220. When a set 210 in a congruence class has a correctable error, the data is purged, corrected as it is sent to a higher level cache or system memory 35 and the set 210 remains online (i.e., available for use). However, if the set 210 has two consecutive correctable errors, the data is purged, marked as corrupted as it is sent to a higher level cache or system memory 35 and the set 210 is the taken offline by the cache controller 220. Also, during any error reporting, instead of evicting the bad data the cache controller 220 may invalidate the cache line (the bad data) if the data has not been changed in relationship to a higher cache level where the data would be sent. By taking more and more sets offline for a particular congruence class 205, that congruence class 205 can dwindle down to a single set (or just a few sets) which gets re-used over and over. This slows down the cache. To avoid this situation, each time the congruence class 205 is accessed by state machines 230 on behalf of any of the processors 105 (e.g., any of the processor cores 10, any application in the system memory 35, etc.), the cache controller 220 compares a number of sets available 241 for the particular congruence class 205 against a (required) minimum number of sets (available) threshold 242. If the number of sets available 241 is equal to and/or less than the minimum number of sets threshold 242, the cache controller 220 (only) evicts the bad data but does not take the particular set 210 offline (i.e., does not delete the particular set) even though the set 210 has two or more repeat correctable errors and/or uncorrectable errors. By not taking the particular set 210 offline even though the set 210 has two or more repeat correctable errors and/or uncorrectable errors, this allows the available number of sets 241 in the particular congruence class 205 not to drop below the minimum number of sets threshold 242. Since the L3 cache 25 in FIG. 2 is illustrated with 12 sets per congruence class, each congruence class 205 may require a minimum of five (5) sets to always be online and thus the minimum number of sets threshold 242 is 5 sets. The minimum number of sets threshold 242 may be set at one-fourth, one-third, one-half, and/or any specific number of the total original sets that were originally available when cache was new. Also, the minimum number of sets threshold 242 can be programmed (changed) by the user and/or the cache controller 220 at any time. For example, the congruence classes 205 may be programmed to have a minimum number of sets threshold 242 that is 2, 3, 4, 5, 6, 7, 8, 9, 10, or 11 sets and/or could be any number greater than 1 but less than 12 (which is the original number of sets). If the minimum number of sets threshold 242 is set to 0, the function for the minimum number of sets threshold 242 is turned off by the cache controller 220.

For each set 210, the cache directory 250 contains information about the status indication 270 of the corresponding memory element 215. All the directory statuses for sets 1-N in a specific congruence class 205 are read out every time a state machine 230 accesses the L3 cache 25. For example, for a specific congruence class 205 that was accessed, from the information for each set 210, the state machine 230 determines how many sets 210 are available and how many sets are taken offline. The available number of sets 241 for each of the congruence classes 1-X can vary according to how many sets are available for cache controller 220 to use. Uncorrectable errors and/or repeat correctable errors for a particular set 210 cause the cache controller 220 (via the state machines 230) to take sets 210 offline until the minimum number of sets threshold 242 is reached for that particular congruence class 205. In one case, the congruence classes 1-X may have different values for some of the congruence classes 1-X while others have the same values for their respective minimum number of sets threshold 242, or the congruence classes 1-X may all have the same value for their minimum number of sets threshold 242 (e.g., the value may be 5 sets).

As mentioned above, the cache controller 220 reads out the status indication 270 for each set 1-N in the particular congruence class 205 (e.g., congruence class 4) to calculate the available number of sets 241 and sums up how many have available bits turned on (e.g., the amount of available bits that have a 1 (one turned on)). Also, the particular congruence class 205 has its own number of currently offline sets 244 calculated by the cache controller 220. By the cache controller 220 reading out the status indication 270 for each set 1-N in the particular congruence class 205 (e.g., congruence class 4), the cache controller 220 sums up all the offline bits for sets 1-N (e.g., 12 sets) in the particular congruence class 205 to obtain the number of currently offline sets 244. Accordingly, if the available number of sets 241 has a value of 7 sets available and if the number of currently offline sets 244 has a value of 5 sets, the total number of sets 210 in the particular congruence class is 7+5=12 sets.

An example scenario is provided below for explanation purposes. In the example scenario, reference will be made to congruence class 4 of the congruence classes 205 and to set 4 of the sets 210, but the description analogously applies to the remaining congruence classes 205 and sets 210 and to all caches (e.g., the L1 cache 15, L2 cache 20, L3 cache 25, and L4 cache 30). Since congruence class 4 is being discussed, the readout (which includes either a 1 or 0 in the available bit position per set 210) of the cache directory 250 is utilized by the cache controller 220 to calculate the available number of sets 241, and the readout (which includes either a 1 or 0 in the offline bit position per set 210) of the cache directory 250 is utilized by the cache controller 220 to calculate the number of currently offline sets 244 for congruence class 4, where both of these threshold are calculations made as needed and (temporarily) stored in memory 240 to make the comparisons discussed herein. The cache controller 220 can also calculate an allowable (sets) offline number threshold 246 by subtracting the minimum number of sets threshold 242 from the total number of sets (i.e., the sum of the sets in both the available number of sets 241 (e.g., 7 sets) and the number of currently offline sets 244 (e.g., 5 sets).

Further, it is assumed that an error (such as an occurrence of a repeat correctable error and/or an uncorrectable error) has occurred when reading data (which is bad data in this case) from set 4 of the congruence class 4. As noted above, the cache controller 220 can evict data with correctable errors from the cache to a higher level cache or memory, and provide the correction on the fly. Also, the cache controller 220 can evict data with uncorrectable errors from the cache to a higher level cache or memory, and provide the corrupt data marking on the fly. If the data has not been changed in relationship to the copy in a higher level cache or memory and the higher level cache or memory has a copy, then the cache controller 220 invalidates the bad data in the set.

Every time the cache controller 220 accesses any congruence class 205 (e.g., addressable index or row) such at the congruence class 4, a selecting state machine 230 retrieves (determines) how many sets (e.g., 7 sets) that particular congruence class 4 has available for data storage and how many sets (e.g., 5) are offline. This information (e.g., 7 sets is the value of the available number of sets 241 for congruence class 4 and 5 sets is the value of the offline number of sets 244 for congruence class 4) comes (is retrieved) at no cost because the cache controller 220 has to access all the sets 1-N (e.g., 12 sets in this example) in the congruence class 4 when determining which set 210 to present to the state machine 230. Once the available number of sets 241 and offline number of sets 244 are determined by the cache controller 220 to be 7 sets and 5 sets respectively, the cache controller 220 compares the available number of sets 241 against the minimum number of sets threshold 242 for the congruence class 4 (that is defined by the user in advance).

The minimum number of sets threshold 242 (as well as a call home number of sets threshold 243) can be varied (by the user and/or the cache controller 220) depending on how essential performance (e.g., there may be a performance value 1-10 taken into account by the cache controller 220, where 1 is the highest and 10 is the lowest) is on this specific computer system having the L3 cache 25 and/or depending on how long it would take to get the (cache) hardware replaced without affecting the customer (e.g., there may be a time value 1-10 taken into account by the cache controller 220, where 1 is the fastest time (e.g., which may correspond to onsite personnel with the replacement cache hardware inventoried onsite) and 10 is the longest time).

During any access to the congruence class 205, if the number of currently offline sets 244 (e.g., the total number of bits with a 1 in the offline bits position for congruence class 4) is greater than the call home number of sets threshold 243 (for congruence class 4), the cache controller 220 (hardware) indicates to firmware (e.g., in the system memory 35, in the cache controller 220, and/or elsewhere in the computer system) that the L3 cache 25 is limited and this L3 cache 25 hardware should be replaced. The cache controller 220 calls home (via firmware) to schedule a repair of the broken cache hardware (e.g., the L3 cache 25) when the number of currently offline sets 244 is greater than the call home number of sets threshold 243.

During any access to the congruence class 205 and the cache controller 220 detects an uncorrectable error (and/or a repeat correctable error) in the set 4, if the available number of sets 241 able to be selected for new data is (equal to and/or) smaller than the minimum number of sets threshold 242 (as determined by the cache controller 220 specifically for congruence class 4 in this example), the cache controller 220 (hardware) can also be set to indicate to firmware (e.g., in the system memory 35, in the cache controller 220, and/or elsewhere in the computer system) that the L3 cache 25 is limited and this L3 cache 25 hardware should be replaced. During any access to the congruence class 205 when the cache controller 220 detects an uncorrectable error (and/or a repeat correctable error) in the set 4 and when the available number of sets 241 able to be selected for new data is (equal to and/or) smaller than the minimum number of sets threshold 242 (as determined by the cache controller 220 specifically for congruence class 4 in this example), the cache controller 220 (hardware) passes this information to the state machine 230 (in the cache controller 220) that will try to evict (purge) the data as soon as possible to avoid data corruption. As such, the cache controller 220 accomplishes this by providing the error correction state machine 230 the location of corrupted data's congruence class 205 and set 210, in this case congruence class 4 and set 4. The error correction state machine 230 will access the set 4 in congruence class 4 and evict the data or invalidate the data if the data is in a higher level cache or memory and has not changed in relationship to that higher level cache or memory. During any access to the congruence class 205 and the cache controller 220 detects an uncorrectable error (and/or a repeat correctable error) in the set 4, the error correction state machine 230 will work to get the data out of L3 cache 25 and take the set 4 offline (in a case where the available number of sets 241 able to be selected for new data is greater than the minimum number of sets threshold 242). However, when the available number of sets 241 able to be selected for new data is (equal and/or) smaller than the minimum number of sets threshold 242, the cache controller 220 is configured to determine that the specific congruence class 4 (i.e., specific addressable index) does not have enough sets 210 (i.e., available number of sets 241) to keep up with the workload and this is then passed onto the error correction state machine 230. As the error correction state machine 230 tries to take the set 4 offline for the congruence class 4 (because of the error), the error correction state machine 230 (i.e., cache controller 220) detects a bad congruence class status (i.e., bad index status) and automatically changes to just purging the data out of the set 4 but not taking the set 4 offline. This prevents a situation where the state machine 230 keeps taking the different sets offline in congruence class 4 and then no sets (or too few sets) are available for that particular congruence class 4; the computer system results in a hang/stall.

Figure 3:
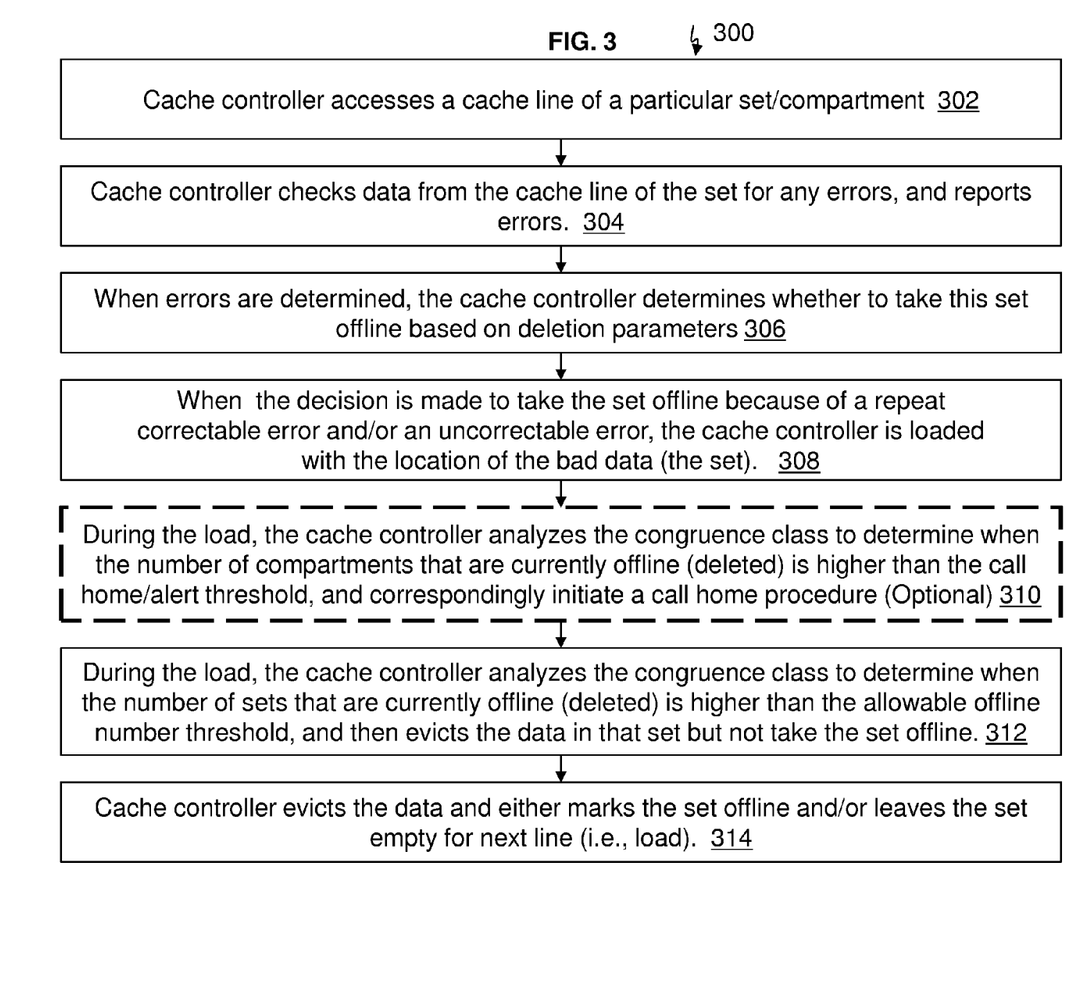
FIG. 3 depicts a process flow for managing sets in a congruence class in accordance with an embodiment.

FIG. 3 is a flowchart 300 of a process for managing sets in a congruence classes according to an embodiment. Reference can be made to FIGS. 1 and 2. Note that the process is executed by the cache controller 220 which can include various state machines 230 that may be configured to perform the actions. The cache controller 220 may include various pieces of logic (both software and hardware) configured to accomplish the features discussed herein.

A cache line (data) is accessed from a set 210 (compartment) by a state machine 230 of the cache controller 220 at block 302. The state machine 230 checks the data from that cache line of the set 210 for any errors, and any errors are reported to error correction state machine 230 at block 304.

When errors are detected, the error correction state machine 230 determines whether it needs to take this set 210 (compartment) offline (delete) based on delete parameters 245 of the cache controller 220 system at block 306. For example, according to the delete parameters 245 stored in the memory 240 of the cache controller 220, the cache controller 220 is configured to delete (take offline) the set 210 based on a repeat correctable error for data stored in the set 210 and/or based on an uncorrectable error being determined for the data in the particular set 210. The cache controller 220 does not take the set 210 offline for a single correctable error.

Once the decision is made to take the set 210 offline by the cache controller 220, the eviction state machine 230 is loaded with the location (address) of the bad data for the set 210 at block 308.

Optionally, during the load of the address for the bad set 210, the cache controller 220 analyzes the congruence class 205 to determine when the number of sets (compartments) that are currently offline (deleted) (i.e., number of currently offline sets 244) is higher than the call home number of sets threshold 243, the cache controller 220 initiates the call home procedure at block 310.

During the load of the address for the bad set 210, the cache controller 220 analyzes the congruence class 205 and determines when the number of sets (compartments) that are currently offline (deleted) (i.e., number of currently offline sets 244) is higher than the allowable (sets) offline number threshold 246 (i.e., the available number of sets 241 is less than the minimum number of sets threshold 242) at block 312.

At block 314, the eviction state machine 230 of the cache controller 220 is configured to evict the data out of the set 210, and then either mark the set offline when the available number of sets 241 is higher than the minimum number of sets threshold 242 and/or leave the set 210 empty for next line (i.e., the next operation/transaction) without marking the set offline when the available number of sets 241 is less than (and/or equal to) the minimum number of (available) sets threshold 242. Accordingly, the cache controller 220 can indicate to the eviction state machine 230 that the eviction state machine 230 needs to evict the data in the set 210 but not take the set 210 offline when the available number of sets 241 is less than (and/or equal to) the minimum number of (available) sets threshold 242.

Figure 4:
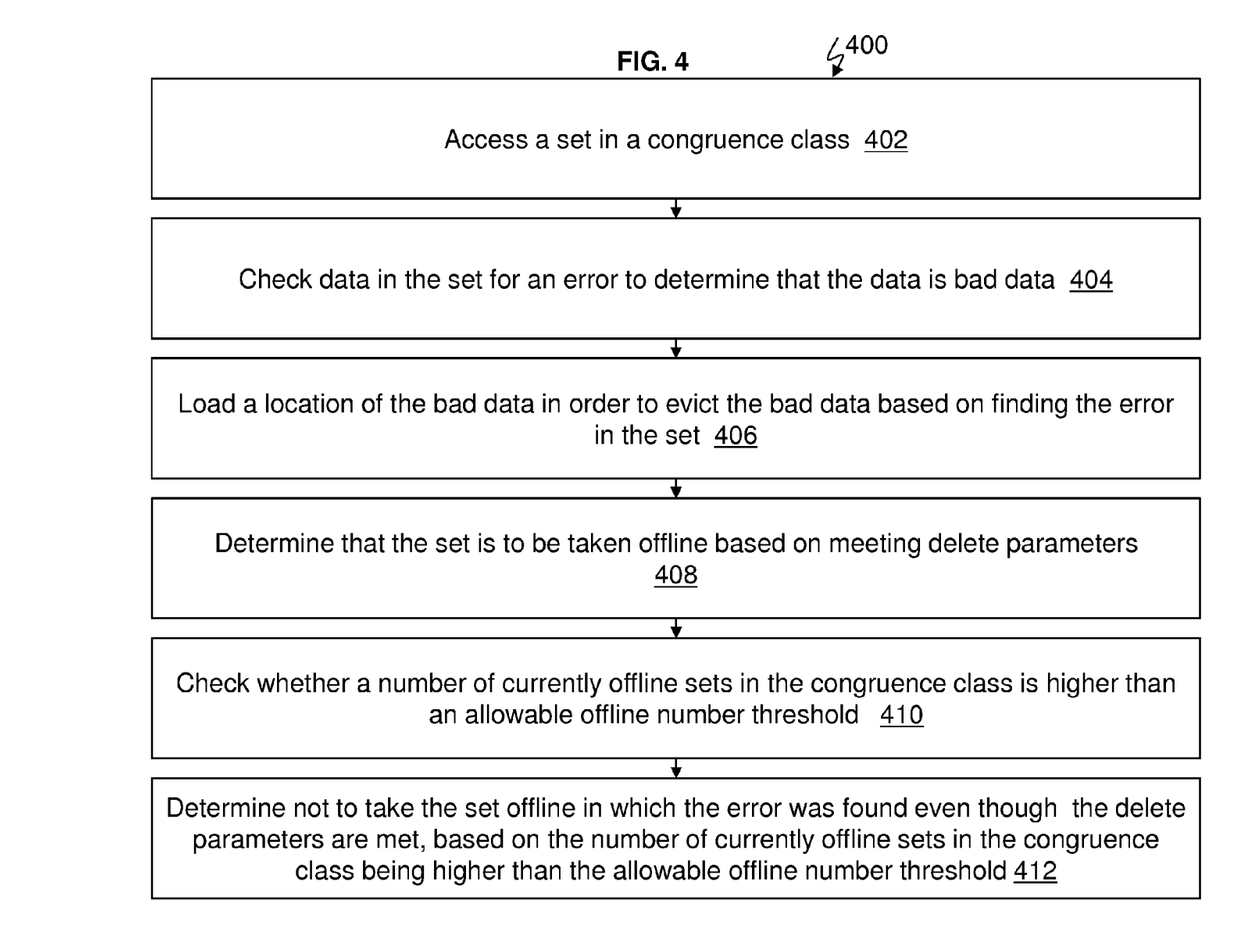
FIG. 4 depicts a method for managing sets in a congruence class in accordance with an embodiment.

FIG. 4 is a flowchart 400 of a method for managing a cache (e.g., the L1 cache 15, L2 cache 20, L3 cache 25, and/or L4 cache 30) according to an embodiment. Reference can be made to FIGS. 1-3.

The cache controller 220 accesses the set 210 in a congruence class 205 (e.g., set 4 in congruence class 4) at block 402 and checks data in the set 210 for an error to determine that the data is bad data at block 404. The cache controller 220 loads a location of the bad data (for the set 4) in order to evict the bad data based on finding the error in the set 210 at block 406. The cache controller 220 determines that the set 210 is to be taken offline based on meeting delete parameters 245 at block 408. The cache controller 220 checks whether the number of currently offline sets 244 in the congruence class is higher than an allowable offline number threshold 246 at block 410. As performed by the cache controller 220, the allowable offline number threshold 246 is determined by taking the original total number of sets (e.g., at installation) for the congruence class 205 (e.g., 12 sets) minus the minimum number of sets threshold 242, which thus provides the allowable offline number (of sets) threshold 246 for the particular congruence class 205.

At block 412, the cache controller 220 determines not to take the set offline (i.e., to keep the set) in which the error was found even though the delete parameters 245 are met for taking the set offline, based on the number of currently offline sets 244 in the particular congruence class 205 being higher than the allowable offline number threshold 246.

Additionally, the cache controller 220 is configured to evict the data in the particular set 210 (e.g., set 4) that has the error regardless of whether the number of currently offline sets 244 in the congruence class 205 is higher than the allowable offline number threshold 246 or not.

The cache controller 220 is configured to override a determination to take the set 4 offline that has fulfilled the delete parameters 245 based on the number of currently offline sets 244 in the congruence class 4 being higher than the allowable offline number threshold 246. As such, the cache controller 220 does not take the set 4 offline in the congruence class 4. On the other hand, the cache controller 220 is configured to take the set 4 offline based on the number of currently offline sets 244 in the congruence class 4 being (equal to or) less than the allowable offline number threshold 246.

The cache controller 220 is configured to check whether the number of currently offline sets 244 in the congruence class 4 is higher than an alert a customer threshold (i.e., the call home number of sets threshold 243), and to alert the customer (i.e., call home) based on the number of currently offline sets 244 in the congruence class 4 being higher than the alert the customer threshold (i.e., the call home number of sets threshold 243).

The cache controller 220 is configured to determine that the error meets the delete parameters 245 to take the set offline by at least one of detecting that the error is a repeat correctable error in the set and/or detecting that the error is an uncorrectable error in the set.

The cache controller 220 is configured to mark the set 4 as deleted and taken offline based on the number of currently offline sets 244 in the congruence class 4 being higher than the allowable offline number threshold 246. The cache controller 220 permits the allowable offline number threshold 246 (and the minimum number of sets threshold 242) to be programmable in order to increase and decrease the allowable offline number threshold 246. As such, decreasing the allowable offline number threshold permits more sets with the error to remain in use for the congruence class 4, while increasing the allowable offline number threshold allows fewer sets with the error to remain in use for the congruence class 4.

Although various examples have been provided for set 4 of the sets 210 and congruence class 4 of the congruence classes 205, the present disclosure is not limited to these examples and the discussion respectively applies for all sets 210 and congruence classes 205. Likewise, the number of sets 210 is not limited to 12 sets total (i.e., not limited to a 12-way set associative cache) but applies to caches with fewer or more sets.

Figure 5:
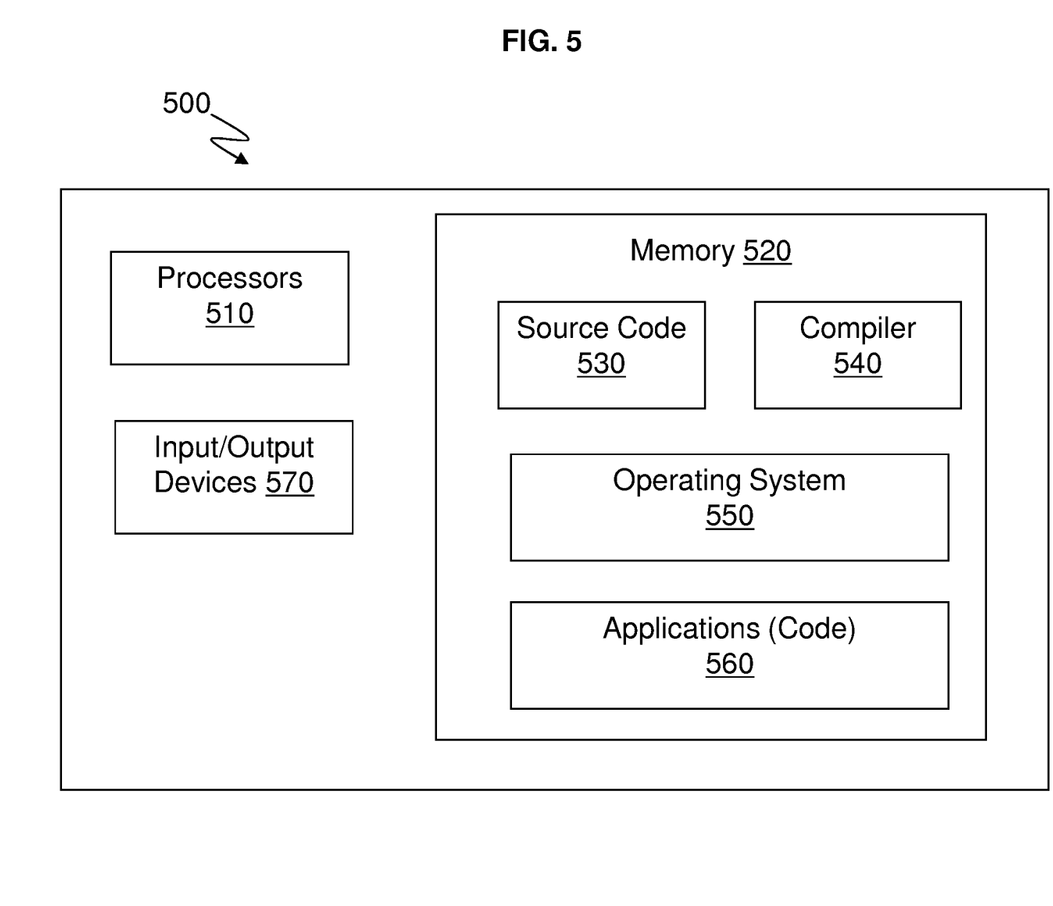
FIG. 5 illustrates an example of a computer having capabilities, which may be included in embodiments.

FIG. 5 illustrates an example of a computer 500 (e.g., as part of the computer system) having capabilities, which may be included in exemplary embodiments. Various methods, procedures, modules, flow diagrams, tools, applications, circuits, elements, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may be utilized to implement, incorporate, to connect to, and/or to support any element discussed herein (as understood by one skilled in the art) in FIGS. 1-4 and 6.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a microprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method.

The application 560 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
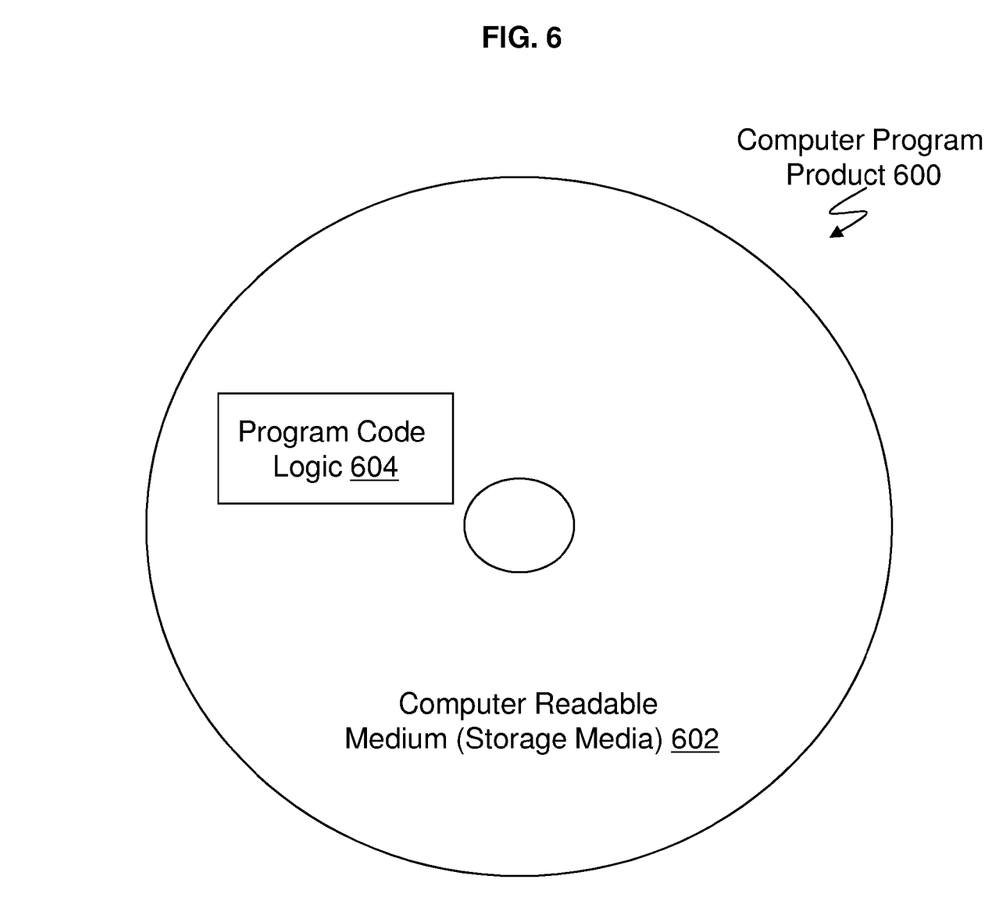
FIG. 6 illustrates a computer program product in accordance with an embodiment.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include a cache controller that indicates to a computer system and user that the cache technology is bad and the cache is near the limit of the addressable index/congruence class. The present disclosure provides a variable programming for the limit depending on how quickly the hardware parts can be replaced. The present disclosure changes the command from taking the set (i.e., bad set) offline to just purging the data out of the set while the command (to retrieve the data from system memory) is in flight, which ensures available sets next time a command (i.e., transaction or operation) needs a set.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for a cache, the method comprising:
   accessing, by a cache controller, a set in a congruence class;
   determining, by the cache controller, that the set contains corrupted data based on an error being found;
   determining that a delete parameter for taking the set offline is met;
   determining, by the cache controller, that a number of currently offline sets in the congruence class is higher than an allowable offline number threshold; and
   determining not to take the set in which the error was found offline based on determining that the number of currently offline sets in the congruence class is higher than the allowable offline number threshold.

2. The method of claim 1, further comprising evicting the data in the set.

3. The method of claim 1, further comprising determining not to take the set offline by generating an override of a determination to take the set that has fulfilled the delete parameter offline based on the number of currently offline sets in the congruence class being higher than the allowable offline number threshold.

4. The method of claim 1, further comprising taking the set offline based on the number of currently offline sets in the congruence class being equal to or less than the allowable offline number threshold.

5. The method of claim 1, further comprising checking whether the number of currently offline sets in the congruence class is higher than an alert customer threshold; and
   alerting a customer based on the number of currently offline sets in the congruence class being higher than the alert customer threshold.

6. The method of claim 1, wherein determining that the delete parameter for taking the set offline is met includes at least one of detecting that the error is a repeat correctable error in the set and detecting that the error is an uncorrectable error in the set.

7. The method of claim 1, further comprising marking the set as deleted and taken offline based on the number of currently offline sets in the congruence class being higher than the allowable offline number threshold.

8. A computer program product comprising:
   a tangible storage medium readable by a processing circuit and storing instructions for execution by the processing circuit for performing a method comprising:
   accessing, by a cache controller, a set in a congruence class;
   determining, by the cache controller, that the set contains corrupted data based on an error being found;
   determining that a delete parameter for taking the set offline is met;
   determining, by the cache controller, that a number of currently offline sets in the congruence class is higher than an allowable offline number threshold; and
   determining not to take the set in which the error was found offline based on determining that the number of currently offline sets in the congruence class is higher than the allowable offline number threshold.

9. The computer program product of claim 8, further comprising evicting the data in the set.

10. The computer program product of claim 8, further comprising determining not to take the set offline by generating an override of a determination to take the set that has fulfilled the delete parameter offline based on the number of currently offline sets in the congruence class being higher than the allowable offline number threshold.

11. The computer program product of claim 8, further comprising taking the set offline based on the number of currently offline sets in the congruence class being equal to or less than the allowable offline number threshold.

12. The computer program product of claim 8, further comprising checking whether the number of currently offline sets in the congruence class is higher than an alert customer threshold; and
   alerting a customer based on the number of currently offline sets in the congruence class being higher than the alert customer threshold.

* * * * *